US008659751B2

(12) United States Patent
Tsukizawa et al.

(10) Patent No.: US 8,659,751 B2
(45) Date of Patent: Feb. 25, 2014

(54) EXTERNAL LIGHT GLARE ASSESSMENT DEVICE, LINE OF SIGHT DETECTION DEVICE AND EXTERNAL LIGHT GLARE ASSESSMENT METHOD

(75) Inventors: Sotaro Tsukizawa, Kanagawa (JP); Kenji Oka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 228 days.

(21) Appl. No.: 13/390,169

(22) PCT Filed: Jun. 7, 2011

(86) PCT No.: PCT/JP2011/003195
§ 371 (c)(1),
(2), (4) Date: Feb. 13, 2012

(87) PCT Pub. No.: WO2011/158463
PCT Pub. Date: Dec. 22, 2011

(65) Prior Publication Data
US 2012/0170027 A1  Jul. 5, 2012

(30) Foreign Application Priority Data
Jun. 17, 2010 (JP) .................. 2010-138354

(51) Int. Cl.
*G01B 9/00* (2006.01)
*G01N 21/00* (2006.01)
*G01B 11/02* (2006.01)
(52) U.S. Cl.
USPC ......... 356/124; 356/127; 356/239.2; 356/515
(58) Field of Classification Search
USPC .................. 356/124–127, 239.1–239.8, 515
See application file for complete search history.

(56) References Cited

U.S. PATENT DOCUMENTS 4,917,480 A * 4/1990 Kato et al. ................. 351/211
5,276,539 A * 1/1994 Humphrey ................... 349/14
(Continued)

FOREIGN PATENT DOCUMENTS

| JP | 2002-352229 A | 12/2002 |
| JP | 2006-318374 A | 11/2006 |
| JP | 2009-169740 A | 7/2009 |

OTHER PUBLICATIONS

Wenjing Jia, et al., "A Comparison on Histogram Based Image Matching Methods", IEEE International Conference on Video and Signal Based Surveillance, Nov. 1, 2006.

(Continued)

*Primary Examiner* — Gregory J Toatley
*Assistant Examiner* — Jarreas C Underwood
(74) *Attorney, Agent, or Firm* — Pearne & Gordon LLP

(57) ABSTRACT

Disclosed are an ambient light reflection determination apparatus and an ambient light reflection determination method enabling to determine reflection without using an edge and even in a case where luminance of a reflection generating part in eyeglasses is low. In a reflection determination apparatus (100), a luminance histogram calculation section (102) calculates a luminance histogram representing a luminance distribution of an eye area image, a difference calculation section (104) calculates a difference histogram by finding a difference between the two luminance histograms calculated from the two eye area images having different photographing timings, an evaluation value calculation section (105) calculates an evaluation value regarding reflection of ambient light based on the difference histogram and a weight in accordance with luminance, and a reflection determination section (107) determines the reflection of ambient light based on the calculated evaluation value.

6 Claims, 8 Drawing Sheets

(56) References Cited

U.S. PATENT DOCUMENTS

| | | | | |
|---|---|---|---|---|
| 5,305,012 | A * | 4/1994 | Faris | 345/7 |
| 6,952,498 | B2 * | 10/2005 | Ishikura | 382/190 |
| 7,071,831 | B2 * | 7/2006 | Johns | 340/576 |
| 7,430,365 | B2 * | 9/2008 | Ng et al. | 396/51 |
| 7,578,593 | B2 * | 8/2009 | Hammoud et al. | 351/246 |
| 2002/0181774 | A1 | 12/2002 | Ishikura | |

OTHER PUBLICATIONS

Extended European Search Report for Application No. 11795371.1-1906 dated Mar. 19, 2013.

International Search Report for PCT/JP2011/003195 dated Jul. 19, 2011.

* cited by examiner

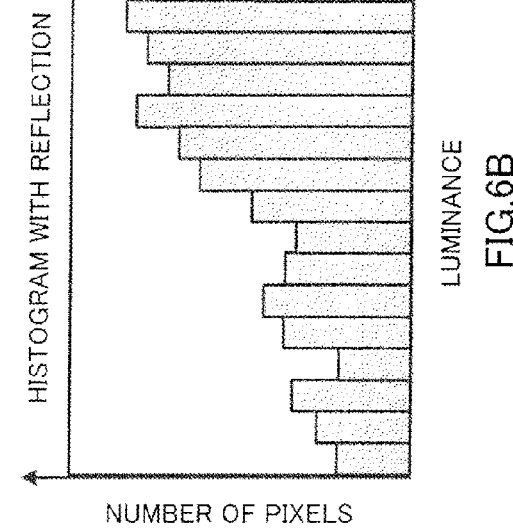
FIG.6A SCHEMATIC VIEW OF HISTOGRAM DIFFERENCE
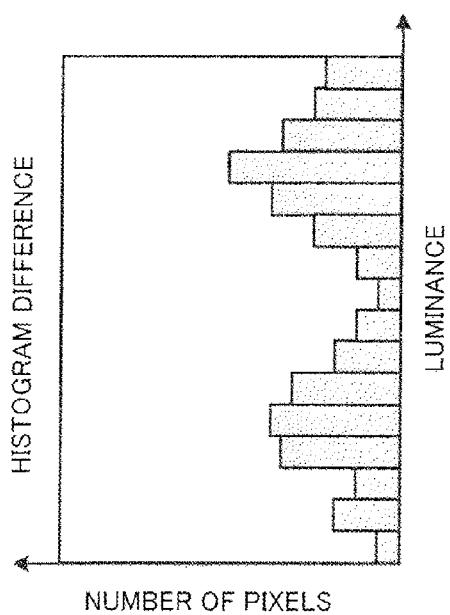
FIG.6B HISTOGRAM WITH REFLECTION
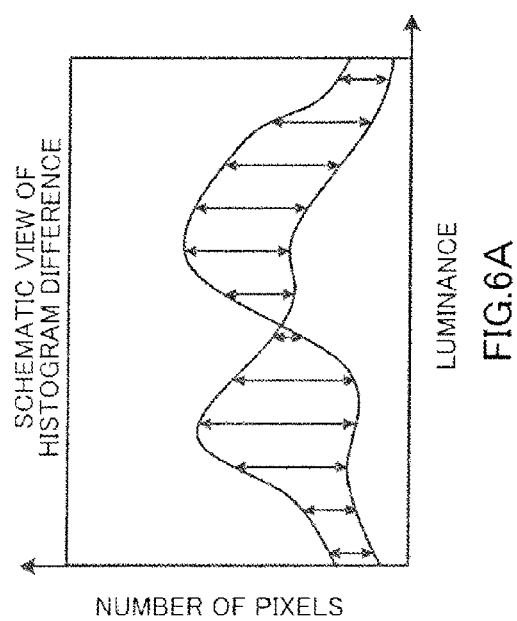
FIG.6C HISTOGRAM WITHOUT REFLECTION
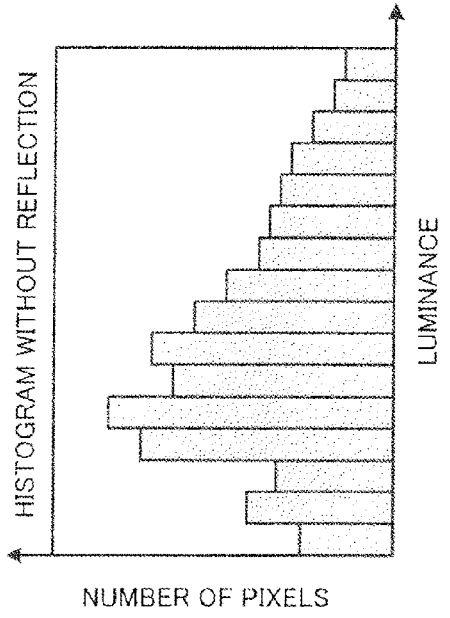
FIG.6D HISTOGRAM DIFFERENCE

EXTERNAL LIGHT GLARE ASSESSMENT DEVICE, LINE OF SIGHT DETECTION DEVICE AND EXTERNAL LIGHT GLARE ASSESSMENT METHOD

TECHNICAL FIELD

The present invention relates to an apparatus for determining reflection of ambient light to eyeglasses, a line-of-sight detection apparatus, and an ambient light reflection determination method.

BACKGROUND ART

In line-of-sight detection or facial expression detection, pupil detection is performed. When this pupil detection is performed at the time of wearing of eyeglasses, a pupil may not be detected. This is caused by a reflection phenomenon, in which ambient light is reflected to lenses of the eyeglasses. The extent of reflection of ambient light to the lenses of the eyeglasses differs depending on the material of the lenses, coating, posture of the face, intensity of the ambient light, wavelength, etc. Thus, it is difficult to estimate a reflection state highly accurately from indirect information other than reflection itself.

To deal with such a problem, a method for detecting reflection of ambient light to lenses of eyeglasses (first ambient light reflection detecting method) is proposed conventionally (for example, refer to Patent Literature 1). In the first ambient light reflection detecting method, reflection of ambient light to lenses of eyeglasses is detected based on a moving direction of an edge of an eye area. In the first ambient light reflection detecting method, since detecting reflection of ambient light to eyeglasses of a driver occurring when a car is moving forward is presupposed, reflection is detected when the edge moves from the top to the bottom of an image.

Also, as a second ambient light reflection detecting method, a method for detecting a high-luminance area of an eye area is proposed (for example, refer to Patent Literature 2). In this method, images are photographed while a light projector irradiating a face is switched, and a high-luminance area that moves in plural obtained images is detected as reflection to lenses of eyeglasses.

CITATION LIST

Patent Literature

PTL 1

Japanese Patent Application Laid-Open No. 2009-169740

PTL 2

Japanese Patent Application Laid-Open No. 2002-352229

SUMMARY OF INVENTION

Technical Problem

However, in the aforementioned first ambient light reflection detecting method, in a case where plural similar edges are reflected, it is difficult to track one edge without mistaking this edge for another edge, which lowers the accuracy of reflection detection or makes detection itself difficult.

Also, in the aforementioned first ambient light reflection detecting method, since detecting reflection of ambient light to the eyeglasses that the driver is wearing occurring when the car is moving forward is presupposed, the detection accuracy is lowered in a state in which the car is circling or a state in which the driver shakes his/her face right and left. The reason for this is that the moving direction of the edge cannot be determined uniquely.

Also, in the aforementioned second ambient light reflection detecting method, since the high-luminance area of the eye area is detected, it is difficult to detect low-luminance reflection.

The present invention is accomplished by taking such problems as mentioned above into consideration thereof, and an object thereof is to provide an ambient light reflection determination apparatus, a line-of-sight detection apparatus, and an ambient light reflection determination method enabling to determine reflection without using an edge and even in a case where luminance of a reflection generating part in eyeglasses is low.

Solution to Problem

A reflection determination apparatus according to an aspect of the present invention is a reflection determination apparatus for determining reflection of ambient light to eyeglasses and includes an image acquisition section that acquires an eye area image of a user wearing the eyeglasses, a luminance histogram calculation section that calculates a luminance histogram representing a luminance distribution of the eye area image, a difference histogram calculation section that calculates a difference histogram by finding a difference between the two luminance histograms calculated from the two eye area images having different photographing timings, an evaluation value calculation section that calculates an evaluation value regarding the reflection of ambient light based on the difference histogram and a weight in accordance with luminance, and a determination section that determines the reflection of ambient light based on the calculated evaluation value.

A reflection determination method according to an aspect of the present invention is a reflection determination method for determining reflection of ambient light to eyeglasses, acquires an eye area image of a user wearing the eyeglasses, calculates a luminance histogram representing a luminance distribution of the eye area image, calculates a difference histogram by finding a difference between the two luminance histograms calculated from the two eye area images having different photographing timings, calculates an evaluation value regarding the reflection of ambient light based on the difference histogram and a weight in accordance with luminance, and determines the reflection of ambient light based on the calculated evaluation value.

A line-of-sight detection apparatus according to an aspect of the present invention includes an image acquisition section that acquires an eye area image of a user wearing eyeglasses, a luminance histogram calculation section that calculates a luminance histogram representing a luminance distribution of the eye area image, a difference histogram calculation section that calculates a difference histogram by finding a difference between the two luminance histograms calculated from the two eye area images having different photographing timings, an evaluation value calculation section that calculates an evaluation value regarding reflection of ambient light to the eyeglasses based on the difference histogram and a weight in accordance with luminance, a credibility calculation section that subtracts a normalized evaluation value obtained by normalizing the calculated evaluation value from a predetermined maximum value of credibility to calculate credibility of a pupil detection result in consideration of an influence on pupil detection caused by the reflection of ambient light, and a line-of-sight detection processing section that performs line-of-sight detection processing of the user and outputs the credibility calculated at the credibility calculation section as well as a line-of-sight detection result.

Advantageous Effects of Invention

With the present invention, it is possible to provide an ambient light reflection determination apparatus, a line-of-sight detection apparatus, and an ambient light reflection determination method enabling to determine reflection without using an edge and even in a case where luminance of a reflection generating part in eyeglasses is low.

BRIEF DESCRIPTION OF DRAWINGS

FIG. 6 describes processing of a difference calculation section;

DESCRIPTION OF EMBODIMENTS

Hereinafter, embodiments of the invention will be described in detail with reference to the drawings.

Embodiment 1

[Configuration of Reflection Determination Apparatus 100]

Figure 1:
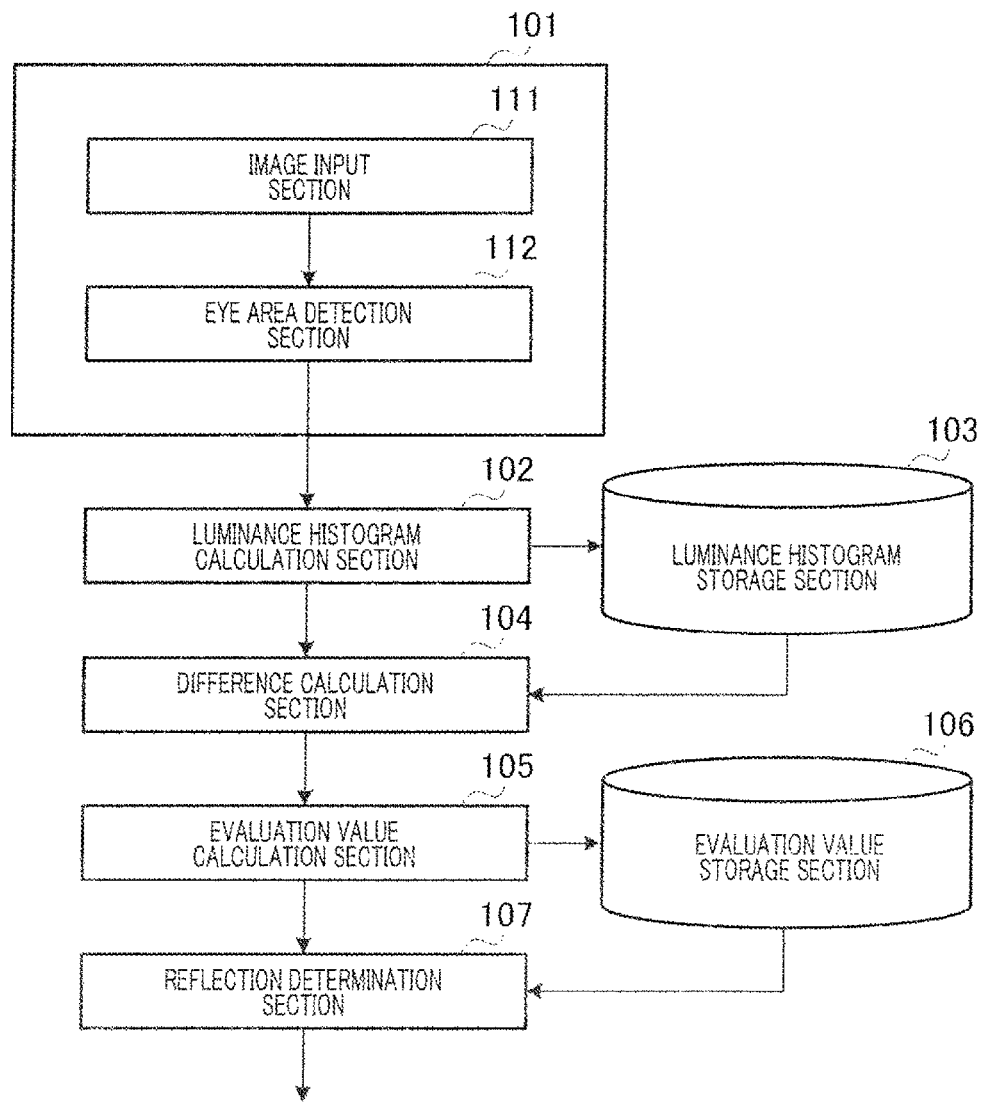
FIG. 1 is a block diagram showing a configuration of a reflection determination apparatus according to Embodiment 1 of the present invention.

FIG. 1 is a block diagram showing a configuration of reflection determination apparatus 100 according to Embodiment 1 of the present invention.

Reflection determination apparatus 100 determines whether or not the extent of a reflection phenomenon caused by reflection of ambient light to eyeglasses exceeds a predetermined level. Reflection determination apparatus 100 is installed, e.g., in a cabin of an automobile and is connected to a line-of-sight detection apparatus in use. This line-of-sight detection apparatus executes processing of detecting a line-of-sight direction of a driver only in a case where reflection determination apparatus 100 determines reflection is weak. Hereinafter, in particular, a case where reflection determination apparatus 100 is applied to the line-of-sight detection apparatus will be described.

In FIG. 1, reflection determination apparatus 100 includes eye area image acquisition section 101, luminance histogram calculation section 102, luminance histogram storage section 103, difference calculation section 104, evaluation value calculation section 105, evaluation value storage section 106, and reflection determination section 107.

Eye area image acquisition section 101 acquires an eye area image and outputs it to luminance histogram calculation section 102.

Specifically, eye area image acquisition section 101 includes image input section 111 and eye area detection section 112.

Image input section 111 photographs a photographing target (i.e., a person herein). This target image data is output to eye area detection section 112.

Image input section 111 is installed at the front of a driver's seat such as on a steering wheel of the automobile or on a dashboard. By doing so, the face of the driver while driving is photographed by image input section 111.

Eye area detection section 112 detects the eye area image from the target image received from image input section 111.

Figure 2:
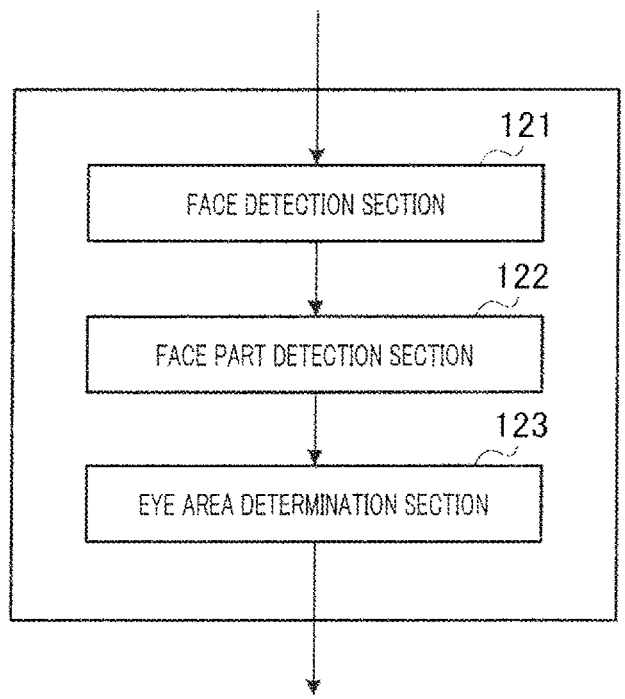
FIG. 2 is a block diagram showing a configuration of an eye area detection section.

Specifically, eye area detection section 112 includes face detection section 121, face part detection section 122, and eye area determination section 123 as shown in FIG. 2.

Face detection section 121 detects a face image from the target image received from image input section 111 and outputs the face image data to face part detection section 122.

Face part detection section 122 detects a group of face parts (i.e., an outer corner of the eye, an inner corner of the eye, etc.) from the face image received from face detection section 121 and outputs positional coordinates of each face part to eye area determination section 123.

Eye area determination section 123 determines the position and size of the eye area image based on the positional coordinates of each face part received from face part detection section 122. The position and size of the eye area image, as well as the target image output from image input section 111, are output to luminance histogram calculation section 102 as eye area image detection results. It is to be noted that the position and size of the eye area image are calculated for each of the right and left eyes.

Returning to FIG. 1, luminance histogram calculation section 102 calculates a luminance histogram of the eye area from the target image data received from eye area image acquisition section 101 and outputs the calculated luminance histogram to luminance histogram storage section 103 and difference calculation section 104.

Luminance histogram storage section 103 makes the luminance histogram received from luminance histogram calculation section 102 correspond to photographing time of the target image used in calculation of the luminance histogram and stores it therein.

Difference calculation section 104 calculates a difference between the luminance histogram received from luminance histogram calculation section 102 and a previous luminance histogram stored in luminance histogram storage section 103 and outputs it to evaluation value calculation section 105 as "a difference histogram."

Specifically, since a history of luminance histograms previously output from luminance histogram calculation section 102 is stored in luminance histogram storage section 103, difference calculation section 104 calculates the difference histogram based on the luminance histogram received at present from luminance histogram calculation section 102 and the history of luminance histograms stored in luminance histogram storage section 103. To be more specific, the difference histogram is calculated by finding a difference between the present luminance histogram and the previous luminance histogram for each bin. This difference histogram is output to evaluation value calculation section 105. For example, the difference histogram is calculated by finding a difference between a luminance histogram at a certain frame and a luminance histogram at a frame 10 frames before the frame. This "10 frames before" is illustrative only, and the present invention is not limited to this.

Evaluation value calculation section 105 calculates an evaluation value from the difference histogram received from difference calculation section 104 and a weight. Specifically, evaluation value calculation section 105 calculates the product of the difference histogram and the weight per bin and calculates the sum of the calculation results to calculate the evaluation value. As for the aforementioned weight, a value in accordance with luminance is used.

To be more specific, evaluation value calculation section 105 has a correlation table between luminance and weight and multiplies a value of each bin in the difference histogram by a weight value corresponding to luminance of each bin in the correlation table. Subsequently, evaluation value calculation section 105 sums multiplication results obtained for all bins to obtain the evaluation value.

The calculated evaluation value is output to evaluation value storage section 106 and reflection determination section 107.

Evaluation value storage section 106 makes the evaluation value received from evaluation value calculation section 105 correspond to photographing time of the target image used in calculation of the evaluation value and stores it therein.

Reflection determination section 107 determines reflection of ambient light based on the evaluation value calculated at evaluation value calculation section 105. This determination is conducted based on the evaluation value received at present from evaluation value calculation section 105 and a history of evaluation values stored in evaluation value storage section 106.

Specifically, reflection determination section 107 determines reflection influencing the accuracy of after-mentioned line-of-sight detection is generated in a case where the evaluation value calculated at evaluation value calculation section 105 is a predetermined threshold value or higher predetermined times in a row (that is, in a case where the evaluation value is a predetermined threshold value or higher all the time during a predetermined period of time). In a case where it is determined at reflection determination section 107 that reflection is generated, line-of-sight detection processing is not performed at a function section performing after-mentioned line-of-sight detection.

[Operations of Reflection Determination Apparatus 100]

Figure 3:
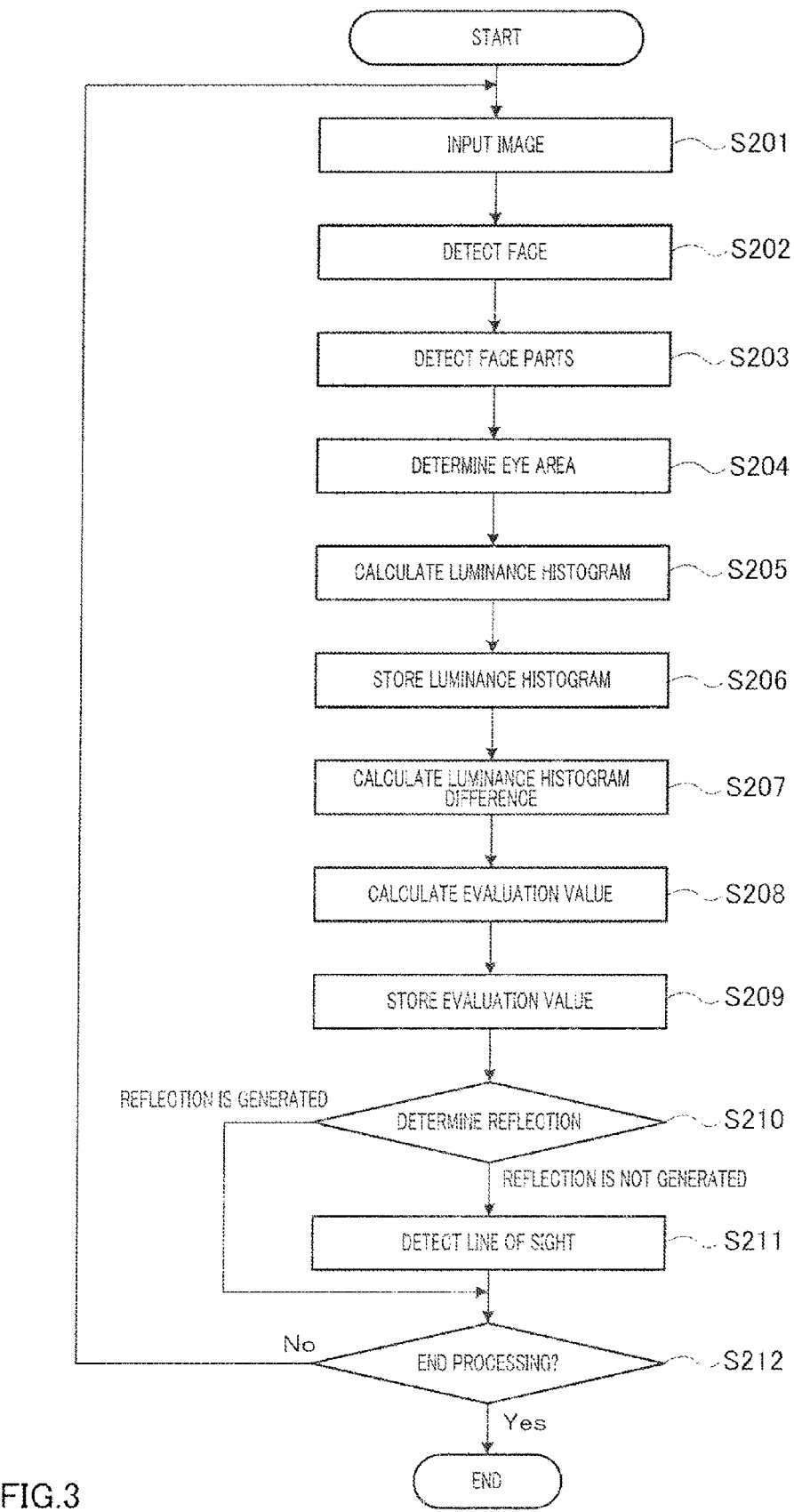
FIG. 3 is a flowchart used for description of operations of the reflection determination apparatus.

Operations of reflection determination apparatus 100 configured as above will be described. FIG. 3 is a flowchart used for description of operations of reflection determination apparatus 100. The flowchart in FIG. 3 contains a processing flow in the aforementioned line-of-sight detection apparatus.

The processing flow shown in FIG. 3 starts at the same time as a start of a photographing operation. The photographing operation may be started by an operation of a user or by a certain ambient signal as a trigger.

At step S201, image input section 111 photographs a photographing target (i.e., a person herein). By doing so, a target image is acquired.

As image input section 111, a digital camera having a CMOS image sensor and a lens is assumed, for example. Thus, an image or the like in PPM (Portable Pix Map) file format photographed at image input section 111 is temporarily stored in a not shown image storage section (e.g., a memory space of a PC) contained in image input section 111 and is thereafter output to eye area detection section 112 as it is in PPM file format.

Figure 4:
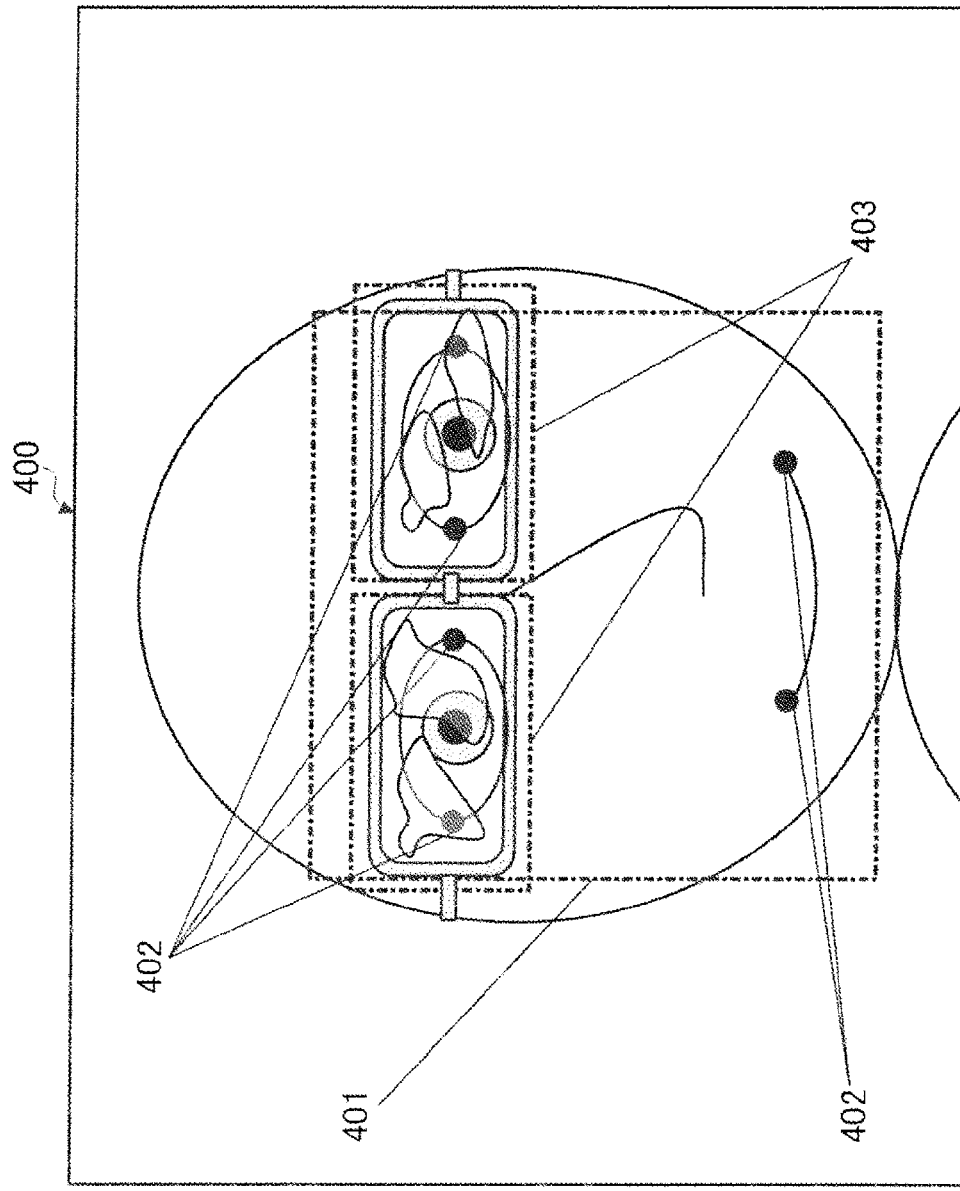
FIG. 4 shows a face image as a target image.

At step S202, face detection section 121 detects a face image from the target image received from image input section 111. FIG. 4 shows the face image as the target image. It is to be noted that, in the photographed face image, the horizontal direction of the image is an X axis, the vertical direction of the image is a Y axis, and one pixel is one coordinate point, for example.

In the face area detection processing, a candidate of a feature image (that is, a feature image candidate) is extracted from the input image, and the extracted feature image candidate is compared with a feature image representing a face area prepared in advance, to detect a feature image candidate having a high degree of similarity. The degree of similarity is derived by comparing the amount of Gabor features of an average face obtained in advance with the amount of Gabor features extracted by scanning of the input image and deriving the reciprocal of the absolute value of the difference between them.

In this case, face detection section 121 identifies as face image 401 an area in image 400 in FIG. 4 most correlated with a template prepared in advance. It is to be noted that the face area detection processing may be performed by detecting a flesh color area from the image (that is, flesh color area detection), detecting an elliptic part (that is, ellipse detection), or using a statistical pattern identification method. Any method may be adopted as long as it is a technique enabling the above face detection.

At step S203, face part detection section 122 detects a group of face parts (i.e., a corner of the mouth, an outer corner of the eye, an inner corner of the eye, etc.) from the face image received from face detection section 121 and outputs positional coordinates of each face part to eye area determination section 123. A search area for the group of face parts is face area 401 identified at step S202. FIG. 4 shows face parts group 402.

In the face parts group detection processing, two-dimensional coordinates of end points of the face parts such as the corner of the mouth, the outer corner of the eye, and the inner corner of the eye and nasal cavities are detected, e.g., with use of a separability filter. Also, by making a learning section learn positional correspondence relations between plural face images and face parts corresponding to the face images in advance, face part detection section 122 may detect a position with the highest likelihood in relation to each of the correspondence relations as a face part when face image 401 is input. Alternatively, face part detection section 122 may search a face part from face image 401 with use of a standard face part template.

At step S204, eye area determination section 123 determines an eye area from the face image received from face detection section 121 and the group of face parts received from face part detection section 122.

In the eye area determining processing, for each of the right and left eyes, rectangular area 403 containing the outer corner of the eye and the inner corner of the eye is determined as an eye area, and coordinates of an upper left end point and a lower right end point of the rectangle are obtained as eye area information, for example.

Figure 5A:
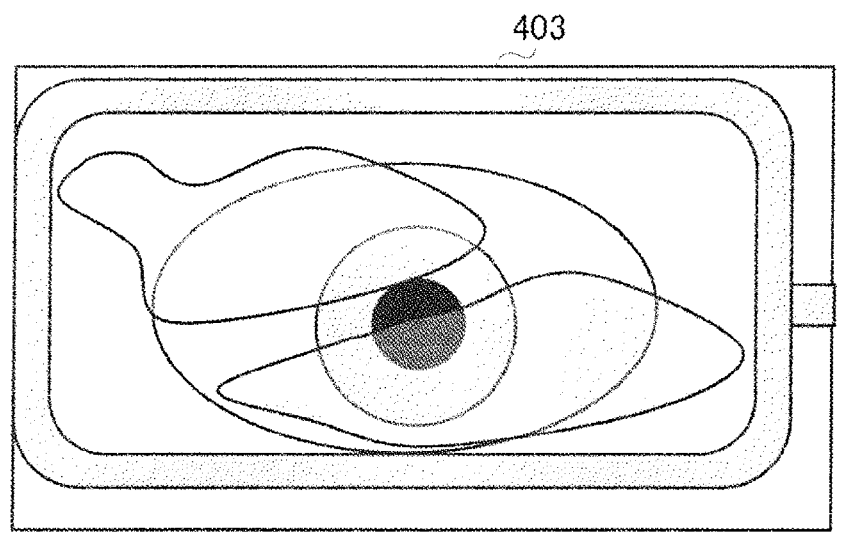
FIG. 5 describes operations of a luminance histogram calculation section.
Figure 5B:
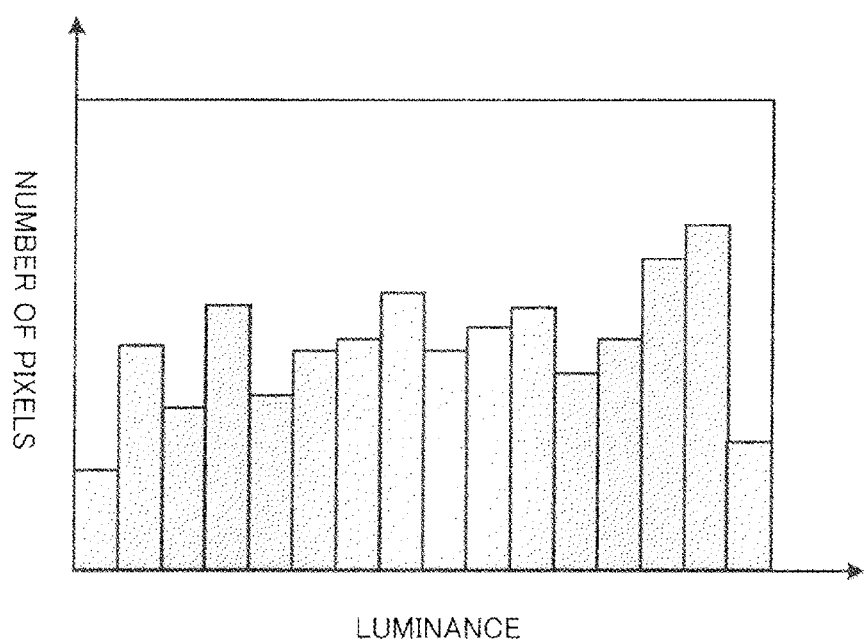

At step S205, luminance histogram calculation section 102 calculates a luminance histogram in eye area 403 from the face image received from face detection section 121 and the eye area information received from eye area determination section 123 (refer to FIG. 5). FIG. 5A shows eye area 403, and FIG. 5B shows a luminance histogram of eye area 403.

The luminance histogram calculated here has 16 bins. That is, in a case where the grayscale of the face image has 256 steps, 16 steps are made to correspond to each bin. Thus, luminance histogram calculation section 102 counts the number of pixels having luminance belonging to each bin in eye area 403. It is to be noted that the number of bins and the number of steps corresponding to each bin are illustrative only, and the present invention is not limited to these numbers.

At step S206, luminance histogram storage section 103 makes the luminance histogram received from luminance histogram calculation section 102 correspond to photographing time of the face image used in calculation and stores it therein as a previous histogram. It is to be noted that information previous to a period of time required for an after-mentioned reflection determination may be overwritten or deleted.

At step S207, difference calculation section 104 calculates a difference between two luminance histograms as shown in FIG. 6A from the luminance histogram received from luminance histogram calculation section 102 and a previous histogram received from luminance histogram storage section 103 to calculate a difference histogram. Specifically, a difference between a first luminance histogram and a second luminance histogram is calculated in an arbitrary bin, and the absolute value of the calculation result is a value of the arbitrary bin in the difference histogram. That is, in a case where the luminance histogram shown in FIG. 6B is the first luminance histogram, and where the luminance histogram shown in FIG. 6C is the second luminance histogram, the difference histogram is as in FIG. 6D.

At step S208, evaluation value calculation section 105 calculates the product of the difference histogram and a weight per bin and calculates the sum of the calculation results to calculate an evaluation value.

Here, as the weight used for an arbitrary bin, average luminance of the arbitrary bin is used. That is, central luminance of a rectangle corresponding to a bin shown in FIG. 5 is a weight to be used for the bin. Meanwhile, variations of the weight to be used will be described later in detail.

Accordingly, in this case, the evaluation value is calculated by equation 1 shown below.

[1]

$$V = \Sigma BS \quad \text{(Equation 1)}$$

where, in equation 1, V means an evaluation value, B means average luminance of each bin, and S means a value of each bin in the difference histogram.

Here, as described above, the evaluation value is calculated by calculating the product of the difference histogram and the weight per bin and calculating the sum of the calculation results. Since the difference histogram is used in calculation of this evaluation value, a fluctuation level of the luminance histogram is reflected on the evaluation value. Also, a weight corresponding to each bin is used in calculation of this evaluation value, and as the weight, average luminance of each bin is used. That is, in this case, the weight is proportional to luminance (Weight Variation 1). Accordingly, the evaluation value is sensitive to a fluctuation of a high-luminance bin and is more insensitive to a fluctuation of a low-luminance bin than in the case of the high-luminance bin but is a value on which the fluctuations are reflected.

In addition, the accuracy of line-of-sight detection is susceptible to the fluctuation level of the luminance histogram. That is, the larger the fluctuation of the luminance histogram is, the more the accuracy of the line-of-sight detection tends to decrease. Accordingly, by using the evaluation value on which the fluctuation level of the luminance histogram is reflected as described above, it is possible to highly accurately determine whether or not reflection influencing the accuracy of the line-of-sight detection is generated. Also, luminance of an image area at which reflection is generated tends to be higher than luminance of an image area at which reflection is not generated, but the absolute value of the luminance has characteristics of not being necessarily high. Accordingly, by using the evaluation value on which the fluctuation of the low-luminance bin is also reflected as described above, it is possible to highly accurately determine whether or not reflection influencing the accuracy of the line-of-sight detection is generated even in a case where low-luminance reflection is generated.

At step S209, evaluation value storage section 106 makes the evaluation value received from evaluation value calculation section 105 correspond to photographing time of the face image used in calculation and stores it therein as a previous evaluation value. At this time, evaluation values previous to a period of time required for an after-mentioned reflection determination may be overwritten or deleted.

At step S210, reflection determination section 107 determines reflection of ambient light based on the evaluation value calculated at evaluation value calculation section 105. Reflection determination section 107 determines whether or not reflection influencing the accuracy of the after-mentioned line-of-sight detection is generated based on the evaluation value calculated at evaluation value calculation section 105. This determination is conducted based on the evaluation value received at present from evaluation value calculation section 105 and a history of evaluation values stored in evaluation value storage section 106.

Specifically, reflection determination section 107 determines reflection influencing the accuracy of the after-mentioned line-of-sight detection is generated in a case where the evaluation value calculated at evaluation value calculation section 105 is a predetermined threshold value or higher predetermined times in a row (that is, in a case where the evaluation value is a predetermined threshold value or higher all the time during a predetermined period of time).

At step S211, a line-of-sight detection section (not shown) detects a line of sight in a case where it is determined at reflection determination section 107 that reflection is not generated.

The line-of-sight detection is calculated from a face direction vector representing a direction of the face in the front direction calculated from the coordinates of face parts group 402 and a line-of-sight direction vector with respect to the front direction of the face calculated from the coordinates of the outer corner of the eye, the inner corner of the eye, and a pupil center.

The face direction vector is calculated, e.g., in the following procedures. First, three-dimensional coordinates of the group of face parts of the driver obtained in advance are converted by rotation and translation. Subsequently, the converted three-dimensional coordinates are projected on the target image used for pupil detection. Subsequently, rotation and translation parameters that best correspond to the group of face parts detected at step S203 are calculated. A set consisting of a vector representing a direction to which the driver's face is directed when the three-dimensional coordinates of the group of face parts of the driver are obtained in advance and a vector rotated by the determined rotation parameter is the face direction vector.

Also, the line-of-sight direction vector is calculated, e.g., in the following procedures. First, three-dimensional coordinates of the group of face parts and the pupil center of the driver when the driver, in a case where his/her face is directed in a predetermined direction, looks in the same direction as the face direction are stored. The pupil center is detected, e.g., by deriving a centroid of pixels having predetermined luminance or lower in the eye area. Subsequently, a position distanced by a predetermined distance in a direction opposite the line-of-sight direction from the detected three-dimensional coordinates of the pupil is calculated as an eyeball center position. At this time, although it is appropriate that the aforementioned predetermined distance should be 12 mm or so, which is a radius of an eyeball of a general adult, an arbitrary value other than the above value may be used. Subsequently, three-dimensional coordinates of the eyeball center at the time of detection are derived with use of the rotation and translation parameters of the face obtained at the time of calculation of the face direction vector. Subsequently, under the assumption that the pupil exists on a sphere centering on the eyeball center and having a radius that has the aforementioned predetermined distance, a position of the detected pupil center on the above sphere is searched. Finally, a vector connecting the eyeball center to the searched point on the sphere is calculated as the line-of-sight direction vector.

At step S212, an end determination is performed. The end determination may be performed by input of a manual end command or by reflection determination apparatus 100 using a certain ambient signal as a trigger.

In a case where it is determined at step S212 that processing is ended, processing in FIG. 3 is ended.

<Weight Variations>

As weight variations, the following variations are assumed other than Variation 1 described above. FIG. 7 describes weight variations.

Figure 7A:
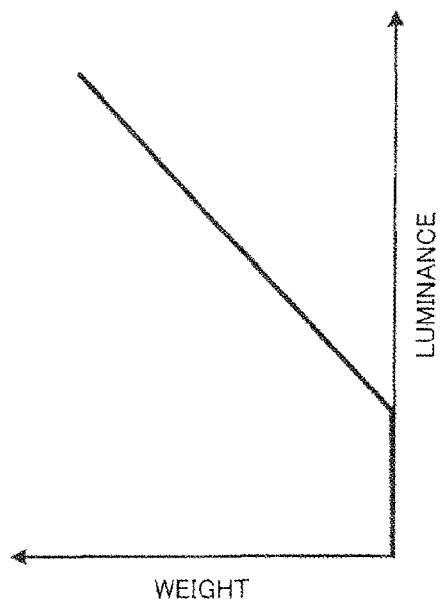
FIG. 7 describes weight variations.
Figure 7B:
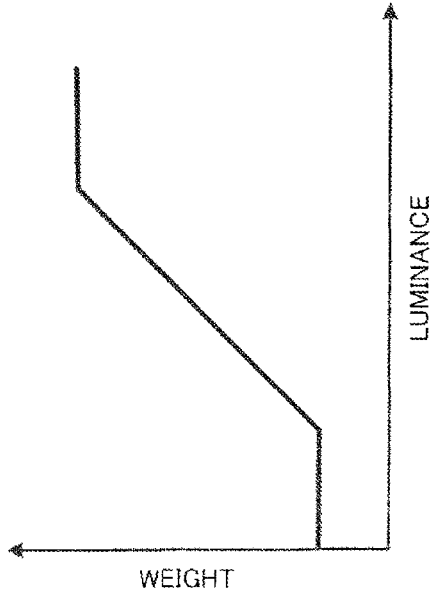
Figure 7C:
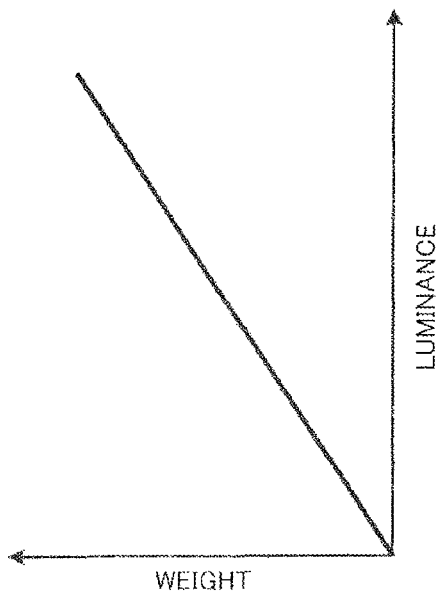
Figure 7D:
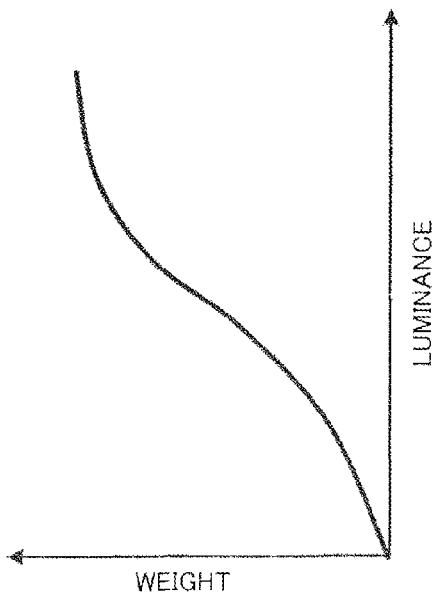

FIG. 7A shows a correlation between luminance and weight in Variation 1. FIG. 7B shows a correlation between luminance and weight in Variation 2. FIG. 7C shows a correlation between luminance and weight in Variation 3. FIG. 7D shows a correlation between luminance and weight in Variation 4.

(Variation 2)

In the weight curve in Variation 2, the weight value is zero in a low-luminance area and increases in proportion to the luminance in a high-luminance area except the low-luminance area. The weight in Variation 2 is suitable for a case in which the entire eye area is significantly bright, and in which it is obvious that low-luminance reflection is not generated. By using this weight, it is possible to prevent the evaluation value from being influenced by a low-luminance part (such as eyelashes).

(Variation 3)

The weight curve in Variation 3 is an S-shaped curve. The weight in Variation 3 is suitable for a case in which the entire eye area is significantly bright, but in which the difference at a low-luminance part is so large as to cause frequent erroneous determinations. By using this weight, since the weight in a case where the luminance is high can be larger, and the weight in a case where the luminance is low can be smaller, erroneous determinations can be reduced.

(Variation 4)

In the weight curve in Variation 4, the weight value is constant in a low-luminance area, increases in proportion to the luminance in a mid-luminance area, and is constant in a high-luminance area. By using this weight, in a case where the entire eye area is dark, and where low-luminance reflection is easily generated, it is possible to prevent the weight in a low-luminance area from falling below a constant value. At the same time, a high-luminance part is highly possibly reflection, and thus in a case where the luminance is higher than a constant value, the weight can be maximum to easily make the evaluation value high.

Variations 1 to 4 described above may be used independently in a fixed manner or may be switched in accordance with the environment in which reflection determination apparatus 100 is operated.

As described above, with the present embodiment, in reflection determination apparatus 100, luminance histogram calculation section 102 calculates a luminance histogram representing a luminance distribution of an eye area image, difference calculation section 104 calculates a difference histogram by finding a difference between the two luminance histograms calculated from two eye area images having different photographing timings, evaluation value calculation section 105 calculates an evaluation value regarding reflection of ambient light based on the difference histogram and a weight in accordance with luminance, and reflection determination section 107 determines reflection of ambient light based on the calculated evaluation value.

Thus, since reflection of ambient light can be determined based on the evaluation value on which a fluctuation level of the entire luminance histogram including a fluctuation of a low-luminance bin is reflected, reflection influencing the accuracy of line-of-sight detection can be determined without using an edge and even in a case where luminance of a reflection generating part in eyeglasses is low.

Embodiment 2

Embodiment 2 relates to a reflection determination apparatus calculating an evaluation value in a similar manner to reflection determination apparatus 100 according to Embodiment 1 and calculating credibility of a pupil detection result or the like based on the calculated evaluation value. In the description of Embodiment 1, pupil detection is not performed in a case where the evaluation value exceeds a predetermined value consecutively. However, even in a case where pupil detection is unstable, there is a case where a pupil detection result is desired as well as information that the detection result has low credibility. To this end, Embodiment 2 provides a pupil detection result as well as credibility information on the pupil detection result or the like.

Figure 8:
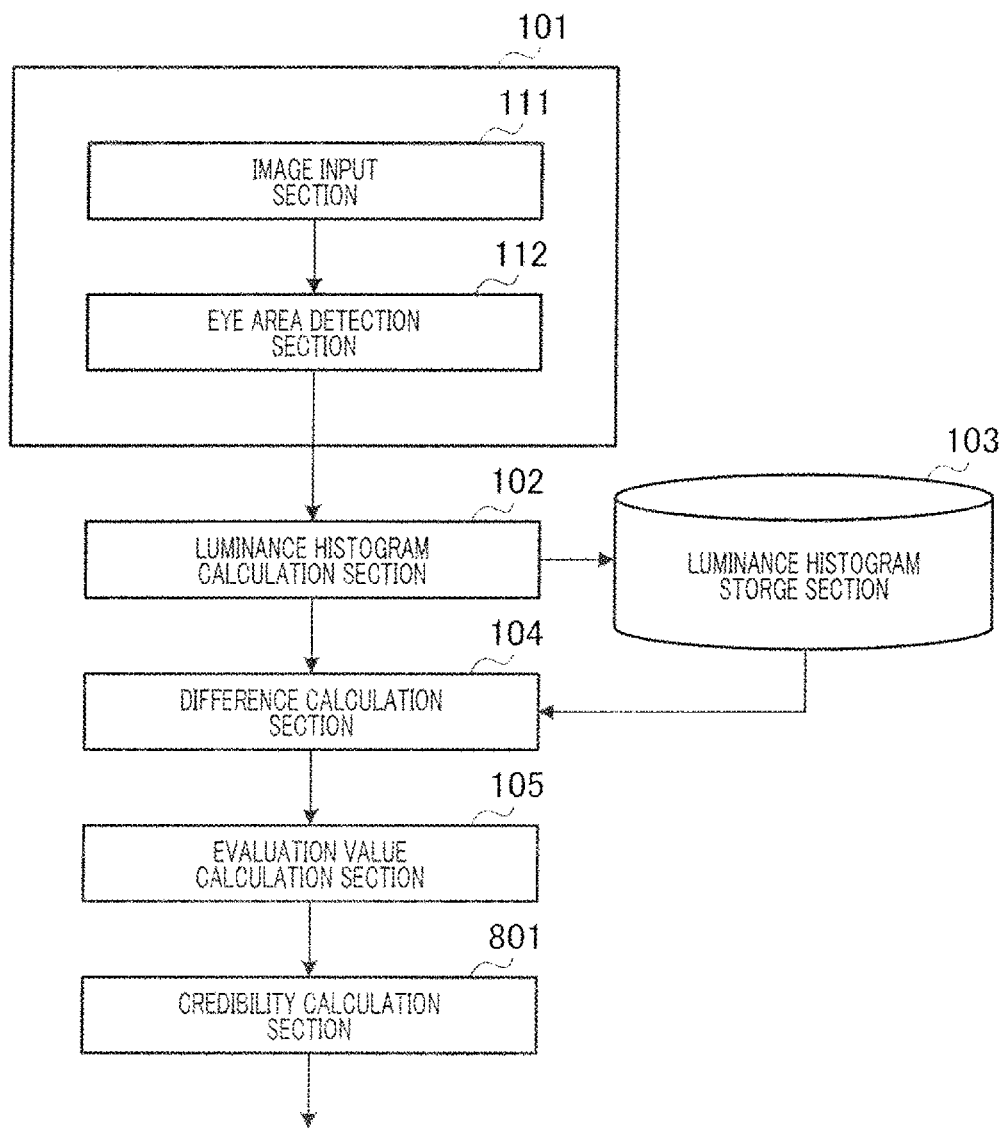
FIG. 8 is a block diagram showing a configuration of a reflection determination apparatus according to Embodiment 2 of the present invention.

FIG. 8 shows a configuration of reflection determination apparatus 800 according to Embodiment 2 of the present invention. In FIG. 8, components having equal functions to those in reflection determination apparatus 100 of Embodiment 1 are shown with the same reference numerals, and description of the duplicate components is omitted.

In FIG. 8, reflection determination apparatus 800 includes credibility calculation section 801.

Credibility calculation section 801 normalizes an evaluation value input from evaluation value calculation section 105 and subtracts the normalized evaluation value obtained in this manner from a maximum value of credibility to calculate credibility of pupil detection. The calculated pupil detection credibility is output to a line-of-sight detection section (not shown) that performs line-of-sight detection in a line-of-sight detection apparatus. Subsequently, the line-of-sight detection section (not shown) outputs the pupil detection credibility as well as a line-of-sight detection result.

Here, the pupil detection credibility is poor in a case where the extent of reflection is high since pupil detection is difficult while it is good in a case where the extent of reflection is low since pupil detection is easy. Specifically, for example, when a value derived by normalizing an evaluation value V shown in equation 1 is $V_n$, credibility C is expressed by equation 2.

[2]

$$C = 1 - V_n \qquad \text{(Equation 2)}$$

where, $V_n$ is a value taking a value from 0 to 1. $V_n$ is a value derived by dividing V by a theoretical maximum value or an empirical maximum value of V, for example. $V_n$ is 1 in a case where a value derived by dividing V by an empirical maximum value of V is 1 or higher.

The pupil detection credibility in the present embodiment is credibility of a pupil detection result in consideration of an influence on pupil detection caused by reflection of ambient light to eyeglasses. That is, credibility of a pupil detection result in consideration of influences on pupil detection caused by other reasons such as instability of pupil detection due to lack of illuminance is not included in the pupil detection credibility in the present embodiment. In a case where the aforementioned influences on pupil detection caused by other reasons are to be taken into consideration, credibility may be calculated for each of the reasons or phenomena, and the total sum or the total multiplication may be used to calculate final credibility of a pupil detection result.

As described above, with the present embodiment, in a line-of-sight detection apparatus including reflection determination apparatus 800, credibility calculation section 801 normalizes an evaluation value calculated at evaluation value calculation section 105 and subtracts the normalized evaluation value obtained in this manner from a maximum value of credibility to calculate credibility of pupil detection. Subsequently, a line-of-sight detection section (not shown) performs line-of-sight detection of a user and outputs pupil detection credibility as well as the line-of-sight detection result.

Thus, line-of-sight direction detection can be performed in consideration of the extent to which a pupil detection result is credible.

Other Embodiments

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-138354, filed on Jun. 17, 2010, including the specification, drawings and abstract, is incorporated herein by reference in its entirety.

INDUSTRIAL APPLICABILITY

An ambient light reflection determination apparatus, a line-of-sight detection apparatus, and an ambient light reflection determination method according to the present invention are suitable for use in determining reflection without using an edge, and even in a case where luminance of a reflection generating part in eyeglasses is low.

REFERENCE SIGNS LIST

100, 800 Reflection determination apparatus
101 Eye area image acquisition section
102 Luminance histogram calculation section
103 Luminance histogram storage section
104 Difference calculation section
105 Evaluation value calculation section
106 Evaluation value storage section
107 Reflection determination section
111 Image input section
112 Eye area detection section
121 Face detection section
122 Face part detection section
123 Eye area determination section
801 Credibility calculation section

The invention claimed is:

1. A reflection determination apparatus for determining reflection of ambient light to eyeglasses, comprising:
   an image acquisition section that acquires an eye area image of a user wearing the eyeglasses;
   a luminance histogram calculation section that calculates a luminance histogram representing a luminance distribution of the eye area image;
   a difference histogram calculation section that calculates a difference histogram by finding a difference between the two luminance histograms calculated from the two eye area images having different photographing timings;
   an evaluation value calculation section that calculates an evaluation value regarding the reflection of ambient light based on the difference histogram and a weight in accordance with luminance; and
   a determination section that determines the reflection of ambient light based on the calculated evaluation value.

2. The reflection determination apparatus according to claim 1, wherein the evaluation value calculation section multiplies a value of each bin in the difference histogram by a weight corresponding to luminance of each bin and sums multiplication results for all bins to calculate the evaluation value.

3. The reflection determination apparatus according to claim 1, wherein the determination section determines the reflection of ambient light is generated in a case where the evaluation value calculated at the evaluation value calculation section is a predetermined threshold value or higher predetermined times in a row.

4. A line-of-sight detection apparatus comprising:
   the reflection determination apparatus according to claim 3; and
   a line-of-sight detection processing section that performs line-of-sight detection processing of the user in a case where it is not determined at the determination section that the reflection of ambient light is generated.

5. A line-of-sight detection apparatus comprising:
   an image acquisition section that acquires an eye area image of a user wearing eyeglasses;
   a luminance histogram calculation section that calculates a luminance histogram representing a luminance distribution of the eye area image;
   a difference histogram calculation section that calculates a difference histogram by finding a difference between the two luminance histograms calculated from the two eye area images having different photographing timings;

an evaluation value calculation section that calculates an evaluation value regarding reflection of ambient light to the eyeglasses based on the difference histogram and a weight in accordance with luminance;

a credibility calculation section that subtracts a normalized evaluation value obtained by normalizing the calculated evaluation value from a predetermined maximum value of credibility to calculate credibility of a pupil detection result in consideration of an influence on pupil detection caused by the reflection of ambient light; and a line-of-sight detection processing section that performs line-of-sight detection processing of the user and outputs the credibility calculated at the credibility calculation section as well as a line-of-sight detection result.

6. A reflection determination method for determining reflection of ambient light to eyeglasses, comprising:

acquiring an eye area image of a user wearing the eyeglasses;

calculating a luminance histogram representing a luminance distribution of the eye area image;

calculating a difference histogram by finding a difference between the two luminance histograms calculated from the two eye area images having different photographing timings;

calculating an evaluation value regarding the reflection of ambient light based on the difference histogram and a weight in accordance with luminance; and determining the reflection of ambient light based on the calculated evaluation value.

\* \* \* \* \*